United States Patent [19]

Hutton

[11] 3,725,600

[45] Apr. 3, 1973

[54] COMMUNICATION CALL HOLDING CIRCUIT

[75] Inventor: Gerald E. Hutton, Springfield, Ill.

[73] Assignee: American Telephone and Telegraph Company, New York, N.Y.

[22] Filed: Dec. 18, 1969

[21] Appl. No.: 886,068

[52] U.S. Cl. ....................179/99, 179/81 R

[51] Int. Cl. ....................H04m 1/00

[58] Field of Search ....................179/99, 81 R

[56] References Cited

UNITED STATES PATENTS

| | | | |
|---|---|---|---|
| 3,420,963 | 1/1969 | Abbott et al. | 179/99 |
| 3,427,407 | 2/1969 | Heck et al. | 179/99 |
| 3,436,488 | 4/1969 | Barbato et al. | 179/99 |
| R26,722 | 11/1969 | Limiero et al. | 179/99 |

*Primary Examiner*—Kathleen H. Claffy
*Assistant Examiner*—William A. Helvestine
*Attorney*—N. S. Ewing and James Warren Falk

[57] ABSTRACT

An electronic telephone call holding circuit including PNPN transistor and pushbutton arrangements is disclosed for enabling a customer conducting a call on one phone to place a "hold" condition on that call, to disconnect that phone from the call by placing the handset "on-hook", and then to answer the call at an extension phone by moving its handset "off-hook", which "off-hook" automatically effects a removal of the "hold" condition without manual key operations.

23 Claims, 1 Drawing Figure

PATENTED APR 3 1973
3,725,600
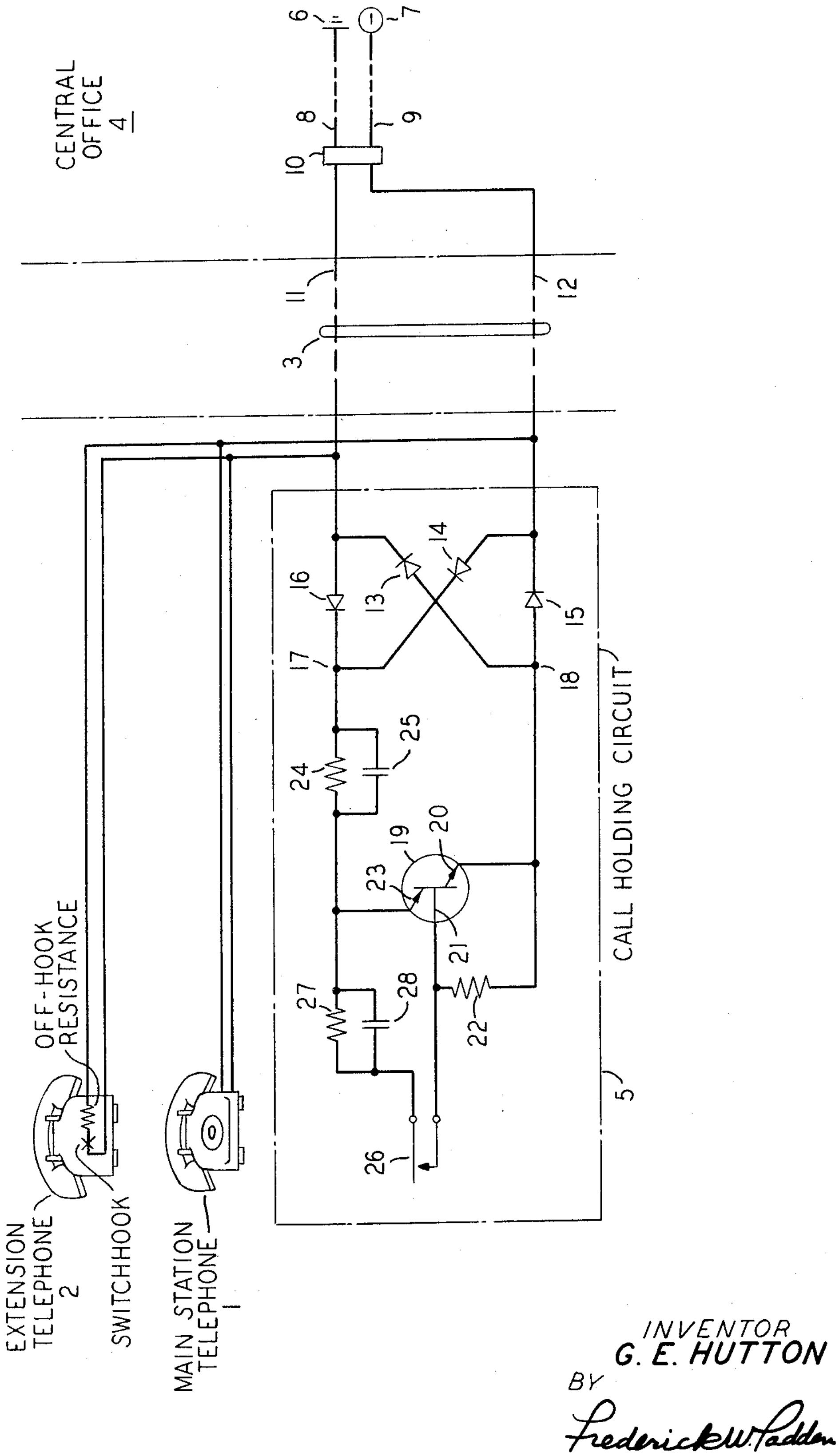
INVENTOR
G. E. HUTTON
BY
Frederick W. Padden
ATTORNEY

COMMUNICATION CALL HOLDING CIRCUIT

BACKGROUND OF THE INVENTION

This invention relates to communication systems and particularly to call holding arrangements for telephone line circuits.

Extension telephones have proven to be a beneficial adjunct to present-day communication systems from the standpoints of customer convenience and the speedy processing and completion of calls. Despite such benefits, however, a customer occasionally encounters some inconvenience when a call on a main station phone is to be continued on an extension and the customer station is not equipped with call holding facilities. The inconvenience results from the need for retaining the main phone on the call at least until the extension is engaged for continuing the call. Under such circumstances, it has been a customary practice for the called party to utilize the assistance of a third person for restoring the main phone to its well-known "on-hook" condition after it is ascertained that the called party has answered the call on the extension. Where such assistance is not used, the main phone usually remains operatively engaged for the duration of the call with, in many cases, extraneous voice and other audible signals being introduced to the main phone during caller and called party conversation. Moreover, there are numerous instances where the main station phone is inadvertently not restored to its " on-hook" state following the termination of the call. As a result, customer incoming calls encounter busy conditions and the switching system performs maintenance operations including the application of the well-known "howler" tones to the line for alerting the customer to the undesired "off-hook" condition.

The foregoing inconveniences and call procedures are substantially eliminated in existing telephone systems by furnishing customers with semiautomatic call holding service. Such service is generally available, but at an extra cost necessitated by the requirements on the customer premises for special power supplies, relays and key apparatus for each phone. Prior art call holding arrangements also generally require numerous key operations for placing a call on "hold" and for subsequently removing that condition from the line for continuing call communication.

In view of the foregoing, it is apparent that a need exists for facilities which improve call holding procedures and service particularly on calls continued on a second phone, such as an extension, after they are initially conducted over a first phone. A specific need exists for reducing the number of manual key operations for applying and withdrawing a call hold condition. Another need is to eliminate the need for special power supplies, relays and key arrangements on customer premises for call holding service.

SUMMARY OF THE INVENTION

In accordance with principles of my invention, a call holding circuit is provided which improves call holding procedures by reducing the number of manual operations needed for applying and withdrawing a call holding condition. A specific exemplary embodiment of my invention is an electronic call holding circuit which operates on power supplied to a customer line from a telephone office for talking and call supervision and thereby eliminates the need for special power supplies at the customer premises as in the prior art.

According to my illustrative embodiment, the call holding circuit enables a person conducting a call on a first phone to place a temporary "hold" condition on that call by a momentary pushbutton operation, to restore that phone to its "on-hook" state, and then to proceed to answer that call for communication on a second phone without any manual key operations. A salient feature of the illustrative holding circuit is that the first phone need not be retained "off-hook" prior to the answering of the call at a second phone. An advantage achieved by the restoral of the first phone to its "on-hook" condition is that it eliminates the need for assistance by a third person. Moreover, it precludes an introduction at the first phone of objectionable extraneous voice and other audible signals during continued call conversation. Another feature of my exemplary holding circuit is that the lifting of the handset of the second phone for continuing the call automatically removes the call "hold" condition without the necessity of key operations as in prior art holding arrangements. As a result, call blockage and maintenance operations heretofore occurring due to inadvertent "off-hook" conditions of the first phone are advantageously reduced in accordance with my invention.

In accordance with other aspects of my invention, the call holding circuitry is connected to a customer line and it can be shared by each phone connected to that line. It illustratively employs a single PNPN transistor device which is activated under control of power conventionally supplied to the customer line from the telephone office for talking and call supervision. As a result, special power supplies, relays and key arrangements of prior art call holding arrangements are no longer needed on the customer premises. A specific embodiment of my invention provides a hold condition to a customer line by switching the PNPN device into a low resistance condition across the line in response to a momentary actuation of a pushbutton switch proximate to or integrated into the phone involved on the call. Advantageously, my invention subsequently enables call communication on that phone to be discontinued by replacing its handset on its switchhook. The latter action generates a call disconnect (on-hook) signal on the customer line. It is a feature of my invention that a capacitor is included in my illustrative holding circuit for recognizing the call disconnect and storing a signal which automatically controls the deactivation of the PNPN device when the call is continued upon the removal of the handset of a second phone from its switchhook. When the latter occurs the hold condition is automatically withdrawn without the need for any key or relay operations.

DRAWING DESCRIPTION

The invention, together with its various objects and features, can be easily understood from the following more detailed description of a specific illustrative embodiment thereof taken in conjunction with the accompanying single sheet of a schematic and block diagram drawing of the exemplary electronic call holding circuit cooperating with facilities for a plural telephone customer station.

DETAILED DESCRIPTION

In the drawing, there is shown a main station telephone 1 and an extension telephone 2 connected to a customer telephone line 3 extending to a central office 4. An electronic call holding circuit 5 according to principles of my invention is also connected to the telephone line 3. It is an advantage of my invention that the holding circuit 5 operates on conventional power supplied at the central office 4 for telephone service and, therefore, without the need for adjunct power supply, relay and key units generally used for telephone call holding arrangements in present-day systems. Specifically, operational power for holding circuit 5 and the phones 1 and 2 is supplied in office 4 by ground and battery potentials 6 and 7 via upper and lower windings 8 and 9 of a conventional line supervisory relay 10 to the tip and ring conductors 11 and 12 of line 3.

Holding circuit 5 comprises a bridge rectifier including diodes 13, 14, 15 and 16 as a protective guard against reversals of potentials 6 and 7 on line 3. Such reversals can occur during initial circuit installation, lightning surges, and supervisory signaling in certain systems. The rectified potentials at terminals 17 and 18 (illustratively ground and negative potential, respectively) are used to bias and operate a PNPN transistor 19 for call holding features.

A cathode electrode 20 of transistor 19 is connected directly to a negative potential at terminal 18 and its gate electrode 21 is connected to the same potential through a resistor 22. Anode electrode 23 of transistor 19 is connected to the potential at terminal 17 via a network including resistor 24 and capacitor 25 in parallel. The latter network is advantageously utilized, as hereinafter explained, for automatically controlling the removal of a call holding condition on line 3. A pushbutton switch 26 is connected in series with a resistor 27 and a capacitor 28 in parallel to the potential (ground) supplied to anode 23.

In a quiescent state during the time prior to an incoming or outgoing call on line 3 and while pushbutton 26 is deactuated, transistor 19 is reverse-biased by the aforementioned bias potentials to its low conduction state. As a result, transistor 19 exhibits a high cathode to anode resistance in series with resistor 24 across terminals 17 and 18. Thus, no call holding condition is applied to line 3.

When either an outgoing or incoming telephone call is present on line 3, one of the phones 1 or 2 has its handset off its switchhook to define its "off-hook" state and thereby exhibit an "off-hook" resistance between line conductors 11 and 12. The latter resistance typically includes that of a transmitter and coils (not shown) of a telephone. Illustratively, when phone 1 is "off-hook" on a call, it completes a circuit for the operation of supervisory relay 10 which indicates in office 4 the presence of a call on line 3. The circuit extends from potential 7 through winding 9, conductor 12, the "off-hook" resistance of phone 1, conductor 11 and winding 8 to ground potential 6.

Oftentimes during such a call, the customer at phone 1 desires to discontinue the call from that phone and proceed to continue the same call at an extension such as phone 2. In some cases, the continuance of the call at the extension is occasioned by the availability of materials or information at the extension phone location or simply because the privacy and tranquility at that location. As alluded to priorly, my invention enables the customer at phone 1 to control the holding of the call on line 3 until it is continued at the extension phone 2. Advantageously, the call holding is effected without leaving phone 1 "off-hook" until the call is continued at extension phone 2 and without the intervention of third person assistance.

According to my invention, the customer initiates the holding of a call on line 3 by momentarily depressing pushbutton 26. The latter action causes a transient forward-biasing potential to be applied to the PNPN gate electrode 21 for switching that transistor into its high conduction state whereby a low resistance is exhibited between its cathode to anode electrodes 20 and 23. The low resistance in series with resistor 24 and the polarity guard diodes holds relay 10 operated in the obvious circuit for, in turn, holding call connections between a distant telephone station and line 3 in a well-known manner. The transient forward-biasing potential is applied to gate electrode 21 from terminal 17 through capacitors 25 and 28. The closure of the pushbutton contacts completes a charging path for capacitors 28 and 25 in series with resistor 22 and initially causes the potential on terminal 17 to appear substantially and instantaneously across resistor 22 for forward-biasing the gate-cathode electrodes 21 and 20. As transistor 19 is switched to its high conduction state capacitors 28 and 25 quickly charge via the cathode-gate electrodes 20 and 21 to a voltage developed across the respective resistors 27 and 24.

Following the momentary depression of the pushbutton, the PNPN remains in its high conduction state to maintain its low resistance in series with resistor 24 for the call holding condition on line 3. In addition, the opening of the pushbutton contacts causes capacitor 28 to discharge through resistor 27. Advantageously, the handset of phone 1 is then replaceable on its switchhook for generating an "on-hook" signal on line 3 and discontinuing communication from that phone over line 3. The "on-hook" resistance of the telephone 1, as well as phone 2, is conventionally higher than its "off-hook" resistance. Consequently, the replacement of the phone 1 handset on its switchhook increases its resistance bridged across line 3 and, accordingly, the potential difference between terminals 17 and 18 of circuit 5. Capacitor 25 then charges proportionally to the increased potentials via the PNPN cathode to anode path. The call on line 3 thereafter remains held under control of circuit 5 until it either is continued from phone 1 or 2 or is terminated at the distant telephone station (not shown). In the latter case, the potentials 6 and 7 are illustratively removed momentarily from the telephone line 3 in a well-known manner for automatically switching transistor 19 into its low conduction high resistance state whereby the call holding condition is automatically removed. Upon the switching of transistor 19, capacitor 25 discharges through resistor 24.

A call holding condition is automatically withdrawn by the removal of either phone 1 or 2 from its switchhook for continuing the call. The latter action causes the low "off-hook" resistance of the phone to be bridged across the line conductors as an answer signal and for thereby reducing the potential difference between terminals 17 and 18. As a result, capacitor 25 discharges to diminish the current flow through the PNPN anode-cathode path to the point where it switches transistor 19 into its low conduction state and thereby automatically removes the call holding condition. Capacitor 25 then completes its discharge through resistor 24. This completes a cycle in the holding circuit 5 operation with a continuation of communication between the caller and and called party.

It is to be understood that the hereinbefore described arrangements are illustrative of the application of principles of my invention. In light of this teaching, it is apparent that numerous other arrangements may be devised by those skilled in the art without departing from the spirit and scope of the invention. Illustratively, it is within the scope of my claimed invention to have the call holding circuit 5 shared by all telephones served by line 3 for providing each phone with call holding service. To implement such service, each phone connected to line 3 is equipped with an individual pushbutton (corresponding to pushbutton 26) which is wired in parallel with pushbutton 26. The call holding procedures for such equipped phones is the same as described hereinbefore with respect to phones 1 and 2. It is, of course, within the scope of my invention to equip each telephone set sharing a telephone line with its own call holding circuit. In such an arrangement the mode of operations in the individual call holding circuits connected to the telephone line is essentially the same as hereinbefore described with regard to circuit 5. Such individual equipment proves advantageous for uniformity of construction and manufacture. Moreover, it is desirable in installations in which telephones are distantly spaced apart and it is not desired to extend wires for pushbutton actuation of a shared calling holding circuit.

What is claimed is:

1. A call holding circuit comprising
means applying a hold condition for a call on a communication line,
and means subsequently responsive solely to an on-hook and then an off-hook signal received from said line for automatically controlling said applying means to withdraw said call hold condition.

2. A telephone call holding circuit operating solely on power supplied over a telephone line and comprising
means activatable under control of said supplied power for applying a hold condition on said line,
means effective during a call on said line for activating said applying means to apply said hold condition on said line for said call, and
means subsequently responsive to a telephone on-hook signal followed by a telephone off-hook signal on said line for automatically deactivating said applying means to withdraw said hold condition from said line.

3. A telephone call holding circuit according to claim 2, wherein said applying means includes a bistable switch device, said activating means includes a pushbutton momentarily actuated for activating said switch device for applying said holding condition, and wherein said deactivating means includes a capacitor controlled by said on-hook and off-hook signals for automatically deactivating said switch device.

4. A telephone call holding circuit operating solely on power supplied over a telephone line shared by a plurality of telephones each of which is equipped with a pushbutton switch and said circuit comprising
holding means connected to said line and responsive during a call to an actuation of one of said pushbutton switches for applying a hold condition to said telephone line, and
means subsequently responsive solely to a prescribed sequence of on-hook and off-hook signals on said line under control of said telephones for automatically controlling said holding means to remove said hold condition from said line.

5. In combination,
means selectively activated for holding communication connections on a communication line,
means responsive to a subsequent receipt of a disconnect signal on said line for storing a predetermined electrical signal during said holding of said connections,
and said holding means being automatically deactivated by said electrical signal upon a subsequent receipt of an answer signal on said line for withdrawing said holding of connections.

6. The combination in accordance with claim 5 wherein said storing means includes a capacitor being charged in response to said disconnect signal on said line,
and said capacitor being further responsive to said answer signal on said line for discharging to effect a deactivating of said holding means to withdraw said holding of connections.

7. The combination in accordance with claim 6 wherein said holding means comprises a transistor arrangement connected to said line, further comprising a switching device selectively actuated for activating said transistor arrangement for applying a hold condition to said line,
said activated transistor arrangement being effective for charging said capacitor in response to said disconnect signal,
and said charged capacitor being responsive to said answer signal on said line for discharging to deactivate said transistor arrangement to withdraw said holding of connections.

8. A holding circuit for a communication line comprising
a transistor arrangement selectively activated for holding a call on said line,
capacitor means charged through said arrangement in response to a call disconnect signal on said line,
and said capacitor means being responsive to a subsequent call answer signal for discharging to deactivate said transistor arrangement for automatically withdrawing said call holding on said line.

9. A holding circuit in accordance with claim 8 wherein said transistor arrangement includes a PNPN device having gate, cathode and anode electrodes,
and further comprising switch means selectively actuated for applying a gating signal to said gate electrode for activating said PNPN device to a low resistance state between said anode and cathode electrodes for holding a call on said line.

10. A holding circuit in accordance with claim 9 wherein said capacitor means charges through said cathode and anode electrodes of said PNPN device in response to said call disconnect signal on said line, and said capacitor means is connected to said anode electrode for discharging to deactivate said PNPN device to a high resistance state between said anode and cathode electrodes for automatically withdrawing said call holding on said line.

11. A holding circuit in accordance with claim 10 further comprising a resistor-capacitor network serially connected with said switch means and said anode electrode for generating said gating signal upon an actuation of said switch means, and a resistor connected in parallel with said capacitor means and to said anode electrode, and wherein said activation of said PNPN device to said low resistance state causes said capacitor means to charge to a first voltage developed across said resistor.

12. A holding circuit in accordance with claim 11 wherein said capacitor means increasingly charges to a second voltage developed across said resistor in response to said call disconnect signal on said line, and said capacitor means discharging from said second voltage for producing a signal at said anode electrode which deactivates said PNPN device to said high resistance state for automatically withdrawing said call holding on said line.

13. An electronic call holding circuit comprising a PNPN switch selectively activated to a low resistance state for providing a hold condition on a communication line, a capacitor, and subset apparatus connected to said line for controlling a charging of said capacitor through said activated switch upon a generation of a call disconnect signal by said apparatus, and said capacitor being subsequently discharged in response to a call answer signal on said line under control of said apparatus for automatically deactivating said switch to a high resistance state for withdrawing said hold condition on said line.

14. In a telephone system having a telephone line including tip and ring conductors, a first subset connected to said conductors and being operative for call communication over said line, a PNPN switch connected between said conductors, means including a pushbutton momentarily actuable for controlling the switching of said switch to a low impedance state between said conductors to place a hold condition on said line, said first subset being controllable for discontinuing call communication over said line while said switch holds said call on said line, a second subset subsequently connected to said conductors for call communication, and control means automatically responsive to said connection of said second subset to said conductors for switching said switch to a high impedance state to remove said hold condition on said line.

15. In a telephone system according to claim 14, the combination wherein said first subset discontinuing of call communication effects an application of an on-hook signal to said conductors, said control means includes a capacitor charged through said low impedance of said PNPN switch in response to said on-hook signal, said second subset connection to said conductors effects an application of an off-hook signal to said conductors, and said capacitor being responsive to said off-hook signal for discharging to effect said switching of said PNPN switch to a high impedance state to remove said hold condition on said line.

16. In a telephone system according to claim 15, the combination wherein said means including said pushbutton comprises an electrical network including said control means capacitor to generate an electrical signal for switching said PNPN switch into said low impedance state between said conductors to place a hold condition on said line.

17. In a telephone system according to claim 16, the combination wherein said PNPN switch includes cathode, gate and anode electrodes, said cathode being connected to a first one of said line conductors, further comprising a first resistor connected in series with said anode and a second one of said line conductors, said control means capacitor being connected in parallel with said first resistor, and said electrical network includes a resistor-capacitor arrangement serially connected with said pushbutton between said anode and gate electrodes.

18. In a telephone system according to claim 17, the combination further comprising electrical voltage for operating said PNPN switch supplied from said line conductors, a polarity guard diode arrangement connected between said cathode and said parallel connected control means capacitor and said first resistor, and wherein said pushbutton is momentarily actuatable to generate said electrical signal at said gate electrode for switching said PNPN switch into a low impedance state between said cathode and anode electrodes, whereby an electrical holding condition is applied across said line conductors through said diode arrangement, said cathode and anode electrodes, and said first resistor.

19. In a telephone system according to claim 18, the combination wherein said control means capacitor charges to a voltage developed across said first resistor during said holding condition on said line, said on-hook signal effects an increase in said electrical voltage developed across said first resistor, and said control means capacitor automatically charges to said increased voltage through said cathode and anode electrodes of said PNPN switch.

20. In a telephone system according to claim 19, the combination wherein said off-hook signal effects a decrease in said electrical voltage developed across said first resistor, and said control means capacitor automatically discharges in response to said voltage decrease for effecting a switching of said PNPN switch to a high impedance state to remove said hold condition on said line.

21. A telephone line holding circuit for a telephone line having multiple station sets connected thereto, said call holding circuit comprising electronic switch means, means for connecting said switch means to the telephone line whereby direct current from a central office can flow through said switch means, and means for applying a transient voltage from the central office to said switch means to place said switch means in a low impedance state, whereby the connection from the central office on the telephone line is held by said switch means.

22. A telephone line holding circuit in accordance with claim 21 further comprising a capacitor connected to said connecting means to be charged to a first potential on said switch means being placed in said low impedance state, to be charged to a higher potential when the stations for that telephone line are all on-hook, and to be discharged to a lower potential when a station set for that telephone line goes off-hook, thereby to return said switch means to a high impedance state.

23. A telephone line holding circuit in accordance with claim 22 wherein said switch means comprises transistor means, said connecting means includes a resistor, said applying means includes means defining a voltage divider, and said capacitor is connected across said resistor.

* * * * *